(12) United States Patent
Yamanaka

(10) Patent No.: US 6,771,584 B2
(45) Date of Patent: Aug. 3, 2004

(54) OPTICAL DISK, ABERRATION CORRECTION METHOD AND OPTICAL DISK APPARATUS

(75) Inventor: Yutaka Yamanaka, Tokyo (JP)

(73) Assignee: NEC Corporation (JP)

( * ) Notice: Subject to any disclaimer, the term of this patent is extended or adjusted under 35 U.S.C. 154(b) by 115 days.

(21) Appl. No.: 10/008,859

(22) Filed: Nov. 8, 2001

(65) Prior Publication Data

US 2002/0054554 A1 May 9, 2002

(30) Foreign Application Priority Data

Nov. 9, 2000 (JP) ........................................ 2000-342392

(51) Int. Cl.$^7$ ................................................ G11B 7/00
(52) U.S. Cl. ............................... 369/112.23; 369/44.23; 369/275.4
(58) Field of Search ........................... 369/44.23, 44.32, 369/44.35, 44.36, 47.17, 47.36, 53.12, 53.13, 53.28, 53.19, 112.01, 112.23, 119, 275.3, 275.4

(56) References Cited

U.S. PATENT DOCUMENTS 4,357,696 A * 11/1982 Bierhoff et al. .......... 369/44.13
6,229,600 B1 * 5/2001 Martynov ................... 356/123
6,324,133 B1 * 11/2001 Ichimura ................. 369/44.27

FOREIGN PATENT DOCUMENTS

JP        2000-020999        1/2000

* cited by examiner

Primary Examiner—Paul W. Huber
(74) Attorney, Agent, or Firm—Hayes Soloway P.C.

(57) ABSTRACT

The invention provides an optical disk wherein a spherical aberration caused by a displacement of the thickness of a transparent substrate of the optical disk can be corrected without giving rise to an increase in scale of the apparatus or an increase of the cost. The recording face of an information recording layer of the optical disk on which a very small spot for recording or playing back information is formed is covered with the transparent substrate. A particular region is provided at a portion of a lead-in region formed in a disk innermost circumference region of the recording face of the information recording layer, and a particular pattern with which a spherical aberration of a very small spot appearing in accordance with a displacement of the thickness of the transparent substrate from a prescribed value is formed in the particular region.

18 Claims, 11 Drawing Sheets

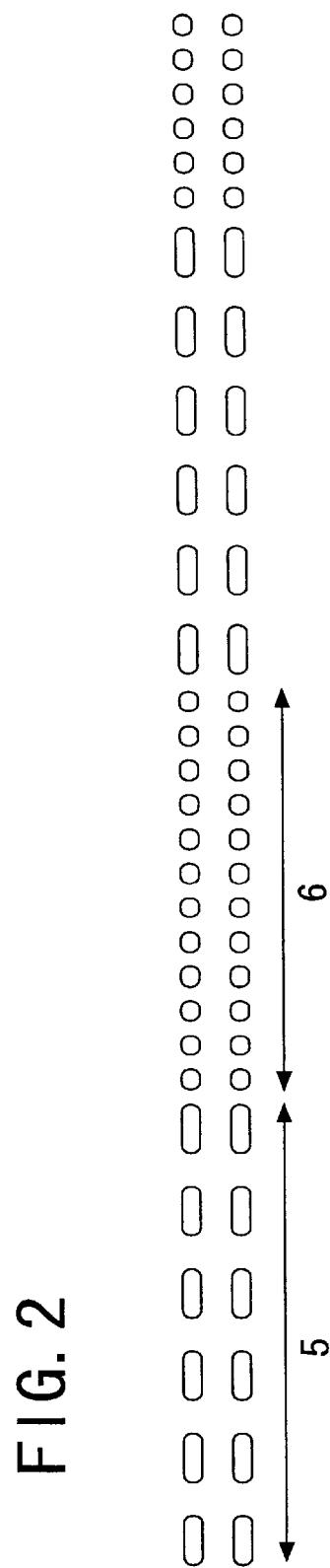

FOCUSED POINT
FOCUS DISPLACEMENT AMOUNT

FOCUSED POINT
FOCUS DISPLACEMENT AMOUNT

FOCUS DISPLACEMENT

FOCUS DISPLACEMENT →

OPTICAL DISK, ABERRATION CORRECTION METHOD AND OPTICAL DISK APPARATUS

BACKGROUND OF THE INVENTION

1. Field of the Invention

The present invention relates to an optical disk and an optical disk apparatus wherein light is condensed at a very small spot to perform recording or playback of information, and also to a method of correcting an aberration appearing on a very small spot upon recording or playback of information using an optical disk of the type just mentioned.

2. Description of the Related Art

An optical disk is known as an information recording medium which allows high density recording without contacting with the same, and a compact disk (CD), a digital versatile or video disk (DVD) and so forth have been put into practical use. In high density recording, wherein an optical disk of the type described is used, in order to achieve an increase in the capacity and increase in the density, the numerical aperture of a condenser of an optical system to be used for formation of a very small spot is increasing. For example, where the numerical aperture for a CD in the past was 0.45, the numerical aperture for a DVD which allows higher density recording is 0.6. It is possible that a condenser of a further high numerical aperture of 0.8 or more will be used in the future.

Recording or playback of information onto or from an optical disk is performed usually by forming a very fine spot on an information recording layer of the optical disk. FIG. 15 schematically illustrates a manner in which a very small spot is formed on an information recording layer of a conventional optical disk.

Referring to FIG. 15, an optical disk 100 is of the type generally placed in practical use and includes a protective transparent substrate 101 which covers a surface of an information recording layer 102. A condenser 103 is a component of an optical system of a recording-playback section of a known optical disk apparatus, and a laser beam for information playback or for information recording is condensed by the condenser 103 so that a very small spot is formed on the surface of the information recording layer 102 of the optical disk 100. The optical disk 100 is structured such that the information recording layer 102 having a very small structure of less than micrometer order is protected by the transparent substrate 101 so that reliability in recording or playback of information can be assured.

In a configuration where a laser beam condensed by the condenser 103 passes through the transparent substrate 101 and forms a very small spot on the surface of the information recording layer 102 as described above, if the numerical aperture of the condenser 103 is increased, then the influence of an aberration which appears with the spot when the thickness of the transparent substrate 101 is displaced from a designed value increases, and it becomes difficult to form a very small spot. If the numerical aperture becomes, for example, 0.85, then the tolerance of the displacement of the thickness of the transparent substrate becomes less than several µm.

An influence of a spherical aberration upon a very small spot when the displacement of the thickness of the transparent substrate is within its tolerance and when the displacement is outside its tolerance is described.

FIG. 16 illustrates a variation of the spot intensity distribution with respect to a variation of the focus displacement where the displacement of the thickness of the transparent substrate is within its tolerance (the thickness of the transparent substrate is substantially within a designed range (prescribed range)). In this instance, the beam diameter exhibits a substantially symmetrical variation before and after a focused point. Here, the focused point signifies a position in which the optical system including the condenser is focused on the object side (optical disk side) and corresponds to a focused point of a camera.

However, if the substrate thickness exceeds the tolerance, then a spherical aberration which provides concentric waveform variations appears. FIG. 17 illustrates a variation of the spot intensity variation with respect to the variation of the focus displacement where the displacement of the thickness of the transparent substrate exceeds the tolerance. In this instance, the spot intensity distribution with respect to the variation of the focus displacement varies asymmetrically before and after the focused point and exhibits an irregular variation such that it has an increased side lobe or has an increased beam diameter at a certain portion thereof. In such a condition, it is difficult to obtain a good playback signal.

In such a case that the displacement of the thickness of the transparent substrate exceeds its tolerance, it is demanded to detect an aberration amount caused by a displacement in thickness of a transparent substrate by some method and correct an influence of the aberration.

Such an aberration detection apparatus as disclosed in Japanese Patent Laid-Open No. 2000-20999 has been proposed. FIG. 18 is a schematic view showing a general configuration of the aberration detection apparatus disclosed in the document just mentioned.

Referring to FIG. 18, the aberration detection apparatus incorporates an interference optical system in an optical system for detecting reflected light from an optical disk and detects an aberration amount from a variation of the intensity distribution caused by interference. The aberration detection apparatus includes an interference plate 200, a convergent lens 201, and a split light detector 202. Reflected light from an optical disk, or light condensed by a condenser (not shown) and reflected from the optical disk, passes through the condenser again, and part of the reflected light is split and enters the interference plate 200, In the interference plate 200, the incoming reflected light is split, and the split light components are overlapped with each other in a state wherein they are spatially displaced from each other a little. The overlapped light is introduced into the split light detector 202 by the convergent lens 201. If an aberration occurs, then the interference condition changes and the aberration can be observed as a variation of the light intensity distribution by the split-light detector 202.

When the numerical aperture of a condenser for forming a very small spot is increased in order to achieve further increase of the capacity and the density of an optical disk, if the displacement of the thickness of the transparent substrate for protecting the information recording layer of the optical disk exceeds its tolerance, then it is necessary to detect the aberration amount caused by the displacement of the thickness of the transparent substrate by some method and correct the influence of the aberration.

Although the aberration detection apparatus disclosed in Japanese Patent Laid-Open No. 2000-20999 mentioned above can solve the subject described above, since it need include a new optical system for detecting an aberration in an optical system of an optical disk apparatus, this gives rise to a new problem that it increases the scale of the apparatus and increases the cost.

SUMMARY OF THE INVENTION

It is an object of the present invention to provide an optical disk, an aberration correction method and an optical disk apparatus wherein a spherical aberration caused by a displacement of the thickness of a transparent substrate of the optical disk can be corrected without giving rise to an increase in scale of the apparatus or an increase of the cost.

In order to attain the object described above, according to an aspect of the present invention, there is provided an optical disk, comprising an information recording layer having a recording face on which a very small spot for recording or playing back information is formed, and a transparent substrate for covering the recording face of the information recording layer, the recording face of the information recording layer having a particular region in which a particular pattern from which a spherical aberration of the very small spot which appears in accordance with a displacement of the thickness of the transparent substrate from a prescribed value can be detected is formed.

With the optical disk, since the particular pattern from which a spherical aberration of a very small spot which appears in accordance with a displacement of the thickness of the transparent substrate from a prescribed value (the displacement is hereinafter referred to as substrate thickness displacement) can be detected is formed in the particular region of the recording face, a spherical aberration can be detected by playing back the particular pattern. Since a conventional optical system for playback can be used for the playback of the particular pattern, there is no necessity to provide a new optical system in order to detect the spherical aberration.

The particular region may be part of a lead-in region formed in an innermost circumference region of the disk. With the optical disk, a spherical aberration caused by a substrate thickness displacement can be detected in an initial stage of playback of the disk.

The particular region may be formed at a plurality of locations of different radial positions of the disk. In this instance, the particular region may be formed at each of part of a lead-in region formed in an innermost circumference region of the disk and part of a lead-out region formed in an outermost circumference region of the disk.

Where the particular region is formed at a plurality of locations of different radial positions of the disk, aberration correction can be performed with regard to the regions at the different radial positions of the disk. Consequently, where the thickness of the substrate exhibits a variation in a radial direction of the disk (radius dependency) like a transparent substrate which is produced, for example, by injection molding, aberration correction can be performed in accordance with the variation of the substrate thickness in the radial direction of the disk. In this instance, where the particular region is formed at each of part of the lead-in region formed in an innermost circumference region of the disk and part of the lead-out region formed in an outermost circumference region of the disk, by playing back the particular pattern in the particular regions, a correction amount for the spherical aberration on the innermost circumference side and a correction amount for the spherical aberration on the outermost circumference side of the optical disk are obtained. Thus, a correction amount for a spherical aberration in a portion of the optical disk in which data pits are recorded between the lead-in region and the lead-out region can be calculated readily through interpolation processing from the thus obtained correction amounts.

The particular pattern may include a plurality of pit trains having different periods from each other and disposed alternately. In this instance, the particular pattern may include a minimum period and a maximum period of coded data to be recorded on the recording face of the information recording layer. Further, a plurality of pit trains having different periods from each other may be disposed alternately over an entire circumference in the same track.

Where the particular pattern includes a plurality of pit trains having different periods from each other and disposed alternately, playback signals which have signal amplitudes different depending upon the periods of the pit trains are obtained, and if an amplitude variation of each of the playback signals of the pit trains with respect to the focus displacement amount is determined, then the amplitude variations exhibit a considerable difference in focus displacement amount (focus offset amount) with which a maximum amplitude is provided. The focus offset amount corresponds to a spherical aberration of a very small spot caused by the thickness displacement of the transparent substrate. Consequently, the spherical aberration can be corrected by such correction as to minimize the difference between the focus off set amounts of the pit trains. Further, where the particular pattern includes a minimum period and a maximum period of coded data to be recorded on the recording face of the information recording layer, aberration correction for all of the periods of recorded pits of coded data can be performed through interpolation processing. Furthermore, where a plurality of pit trains having different periods from each other are disposed alternately over an entire circumference in the same track, a spherical aberration can be corrected in accordance with the thickness variation of the transparent substrate in a circumferential direction.

The particular pattern may include pits or spaces between pits of a first length and pits or spaces between pits of a second length disposed alternately in a fixed period. With the optical disk, the ratio between the amplitude of the playback signal from the pits or the spaces between pits of the first length and the amplitude of the playback signal from the pits or the spaces between pits of the second length varies in accordance with the spherical aberration caused by the thickness displacement of the transparent substrate. Consequently, the spherical aberration can be corrected by setting the amplitude ratio of the playback signals of the pits or the spaces so as to fall within a predetermined range.

According to another aspect of the present invention, there is provided an aberration correction method, comprising a first step of forming, in a particular region of a recording face of an information recording layer of an optical disk wherein the recording face of the information recording layer on which a very small spot for recording or playing back information is formed is covered with a transparent substrate, a particular pattern wherein a plurality of pit trains having periods different from each other are disposed alternately, a second step of moving a condenser for forming the very small spot along an optical axis of the condenser to play back the particular pattern to determine amplitude variations of playback signals of the pit trains with respect to a focus error amount, a third step of determining focus offset amounts each of which provides a maximum amplitude from the amplitude variations of the playback signals of the pit trains determined in the second step, and a fourth step of adjusting the angle with which a light beam incoming to the condenser diverges or converges so that the difference between the focus offset amounts of the pit trains determined in the third step may be minimized to correct the spherical aberration of the very small spot which appears in accordance with a displacement of the thickness value of the transparent substrate from a prescribed value.

According to a further aspect of the present invention, there is provided an aberration correction method, comprising a first step of forming, in a particular region of a recording face of an information recording layer of an optical disk wherein the recording face of the information recording layer on which a very small spot for recording or playing back information is formed is covered with a transparent substrate, a particular pattern wherein pits or spaces between pit shaving a first length and pits or spaces between pits having a second length are disposed alternately in a fixed period, and a second step of adjusting the angle with which a light beam incoming to the condenser diverges or converges so that the ratio between the amplitude of a playback signal from the pits or the spaces between pits of the first length and the amplitude of another playback signal from the pits or the spaces between pits of the second length may have a predetermined value to correct the spherical aberration of the very small spot which appears in accordance with a displacement of the thickness value of the transparent substrate from a prescribed value.

Both of the aberration correction methods may further comprise a step of correcting a frequency characteristic of a signal output of a photo-detector which detects reflected light from the pits formed on the recording face of the information recording layer so as to be a predetermined frequency characteristic to correct the spherical aberration of the very small spot occurring in accordance with the displacement of the thickness of the transparent substrate from the prescribed value.

According to a still further aspect of the present invention, there is provided an optical disk apparatus, comprising a condenser movable along an optical axis thereof for forming a very small spot for recording or playing back information on a recording face of an information recording layer of an optical disk wherein the recording face of the information recording layer is covered with a transparent substrate, an aberration correction element for adjusting the angle with which a light beam incoming to the condenser diverges or converges, a photo-detector for detecting reflected light from a pit formed on the recording face of the information recording layer, and control means for controlling the adjustment of the diverging or converging angle of the incoming light beam by the aberration correction element so that the amplitude of a playback signal, outputted from the photo-detector, of a particular pattern formed in a particular region of the recording face of the information recording layer from which a spherical aberration of the very small spot occurring in accordance with a displacement of the thickness of the transparent substrate from a prescribed value can be detected may be a predetermined amplitude.

The control means may include aberration detection means for moving the condenser along the optical axis of the same to obtain, from the output of the photo-detector, a playback signal of the particular pattern formed in the particular region of the recording face of the information recording layer and including a plurality of pit trains having periods different from each other and disposed alternately, determining, from the obtained playback signal, amplitude variations of the playback signals of the pit trains with respect to a focus error amount and determining focus offset amounts each of which provides a maximum amplitude from the determined amplitude variations of the playback signals of the pit trains, and incoming angle control means for controlling the adjustment of the angle with which the incoming light beam diverges or converges by the aberration correction element so that the difference between the focus offset amounts of the pit trains determined in by the aberration detection means may be minimized.

Alternatively, the control means may include aberration detection means for determining, from the playback signal, outputted from the photo-detector, of the particular pattern formed in the particular region of the recording face of the information recording layer and including pits or spaces between pits of a first length and pits or spaces between pits of a second length disposed alternately in a fixed period, a ratio between the amplitude of the playback signal from the pits or the spaces between pits of the first length and the amplitude of the playback signal from the pits or the spaces between pits of the second length, and incoming angle control means for controlling the adjustment of the diverging or converging angle of the light beam by the aberration correction element so that the amplitude ratio determined by the aberration detection means may have a predetermined value.

The optical disk apparatus may further comprise a variable frequency characteristic amplifier for correcting a frequency characteristic of the signal output of the photo-detector so as to be a predetermined frequency characteristic.

The optical disk apparatus may further comprise storage means for storing adjustment values of the diverging or converging angle of the incoming light beam by the aberration correction element set so that the amplitude of the playback signal of the particular pattern may be a predetermined amplitude, the control means calculating, upon playback of a pit train other than the particular pattern formed on the recording face of the information recording layer, an adjustment value for the pit train through interpolation from the adjustment values stored in the storage means in accordance with a period of the pit train and a radial position of the disk and performing the adjustment of the diverging or converging angle of the incoming light beam by the aberration correction element with the adjustment value calculated through the interpolation.

With the aberration correction methods and the optical disk apparatus, the spherical aberration of a very small spot caused by the thickness displacement of the transparent substrate can be corrected in accordance with the action of the optical disk of the present invention described above.

According to a yet further aspect of the present invention, there is provided an optical disk apparatus, comprising a photo-detector for detecting reflected light from a pit formed on a recording face of an information recording layer of an optical disk wherein the recording face of the information recording layer is covered with a transparent substrate, and a variable frequency characteristic amplifier for correcting a frequency characteristic of a signal output of the photo-detector so as to be a predetermined frequency characteristic.

With the optical disk apparatus, since the signal amplitude played back from an optical disk exhibits, where the spherical aberration is not very great, such a variation that a high frequency side portion of the signal is emphasized as hereinafter described in detail, the variation of the frequency characteristic can be corrected by the variable frequency characteristic amplifier so that it may become a predetermined frequency characteristic which is an original frequency characteristic free from any aberration.

In summary, according to the present invention, only by forming a particular pattern in a particular region of an optical disk, a spherical aberration caused by a displacement of the substrate thickness can be detected and corrected without providing a special optical system for detecting the aberration on the optical head side, and therefore, an optical disk and an optical disk apparatus which can be designed as products without giving rise to an increase in size or an increase in cost of the apparatus can be anticipated.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 2 is a schematic view showing an example of a particular pattern used for the optical disk of FIGS. 1A and 1B;

DESCRIPTION OF THE PREFERRED EMBODIMENT

Figure 1A:
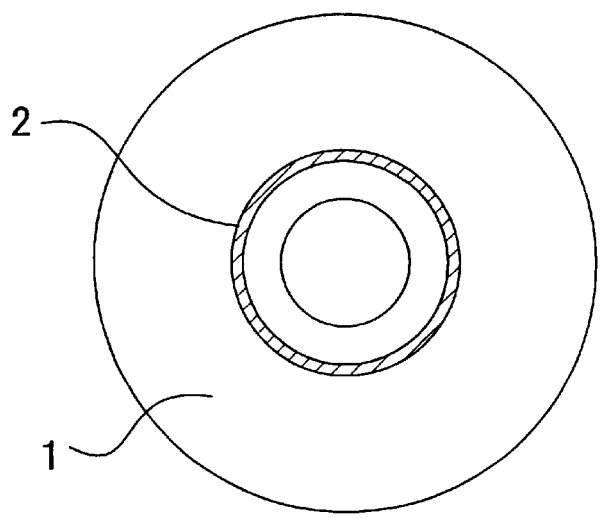
FIGS. 1A and 1B are a top plan view and a sectional view, respectively, showing a general configuration of an optical disk to which the present invention is applied.
Figure 1B:
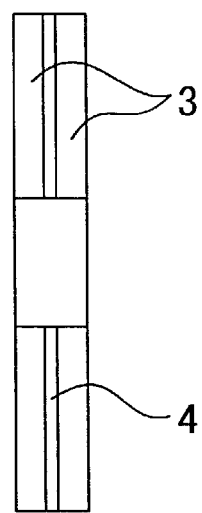

Referring to FIGS. 1A and 1B, there is shown a general configuration of an optical disk to which the present invention is applied. The optical disk shown is generally denoted at 1 and includes a pair of transparent substrates 3 and an information recording layer 4 held between the transparent substrates 3. The optical disk 1 has concentric or spiral information tracks formed on a recording face of the information recording layer 4 thereof. Although the transparent substrates 3 are provided on the front and rear faces of the information recording layer 4, alternatively a single transparent substrate 3 may be provided only on the recording face side of the information recording layer 4. The information recording layer 4 may have a multilayer structure. Further, the information recording layer 4 may be of a type wherein embossed pits are provided on the surface of a transparent substrate or another type which uses such a recording medium that the state of the recording face changes when a laser beam is irradiated thereupon.

A particular region 2 (region indicated by slanting lines in FIG. 1A) is provided on the innermost circumference of the recording face of the optical disk 1, and a particular pattern for detecting a spherical aberration caused by a displacement of the substrate thickness of the transparent substrate 3 is formed in the particular region 2. FIG. 2 is a schematic view showing an example of the particular pattern. In the present example, the particular pattern is configured such that two kinds of pit trains 5 and 6 having different periods from each other are formed alternately. The period of the pit train 5 is longer than the period of the pit train 6. Such a particular pattern as just described may be formed in advance as embossed pits or may be written into the information recording layer 4 of the optical disk 1 by a known optical disk apparatus. Further, the particular pattern of the particular region 2 can be played back by a reading optical system of a known optical disk apparatus.

Now, a principle of detection of a spherical aberration from the particular pattern of the particular region is described.

Figure 3:
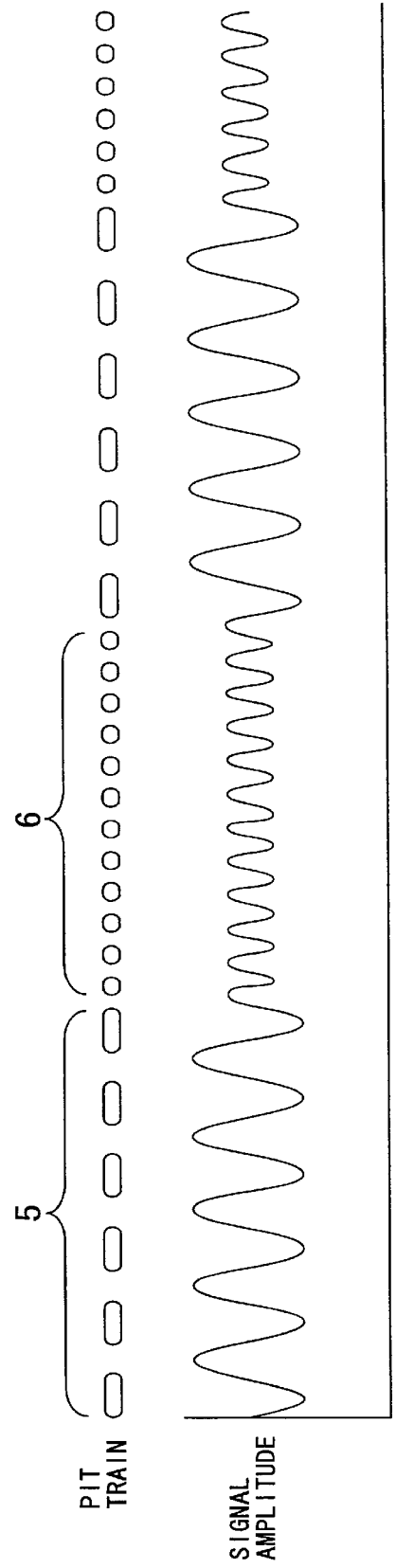
FIG. 3 is a waveform diagram showing an amplitude of a playback signal of a particular pattern wherein two pit trains having different periods are formed alternately on the optical disk shown in FIGS. 1A and 1B.

FIG. 3 is a waveform diagram of a signal obtained by playing back the particular pattern wherein the two kinds of pit trains 5 and 6 having different periods from each other are formed alternately. As seen in FIG. 3, the amplitude of the playback signal is large at a portion of the pit train 5 having the long period, but is small at another portion of the pit train 6 having the short period. In this manner, different signal amplitudes corresponding to the periods of the pit trains are obtained from the particular pattern.

Figure 4:
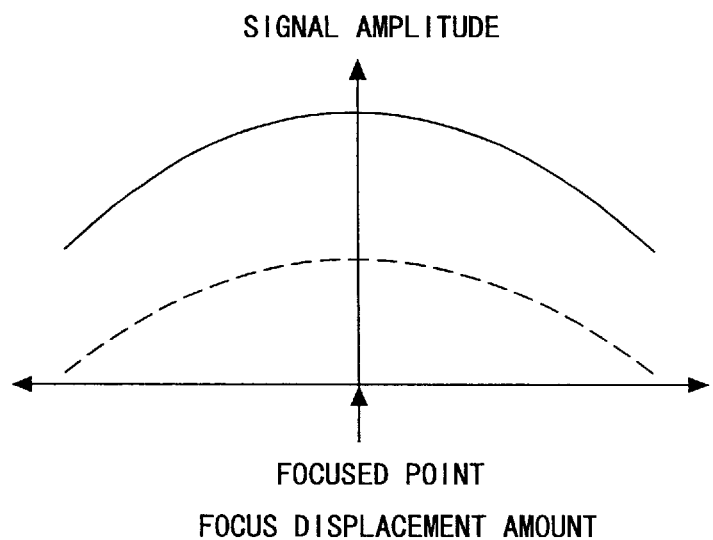
FIG. 4 is a diagram illustrating a variation of the amplitude with respect to the displacement amount of the focus of the playback signal of the particular pattern shown in FIG. 3 where no spherical aberration is involved.

FIG. 4 is a diagram illustrating a variation of the amplitude with respect to the amount of displacement of the focus of a playback signal of the particular pattern when no spherical aberration is involved. In FIG. 4, a solid line curve indicates an amplitude variation of the playback signal of the pit train 5 of the longer period, and a broken line curve indicates an amplitude variation of the playback signal of the pit train 6 of the shorter period. In the present example, a condenser of a playback optical system is moved back and forth in the direction of an optical axis thereof to move the focus, and the amplitude variation of the playback signal from the pit trains 5 and 6 then is detected. As can be seen from the present example, where no aberration is involved, the variation of the amplitude of the playback signal when the playback spot is displaced from the focus of the playback optical system is substantially symmetrical before and after the focused point.

Figure 5:
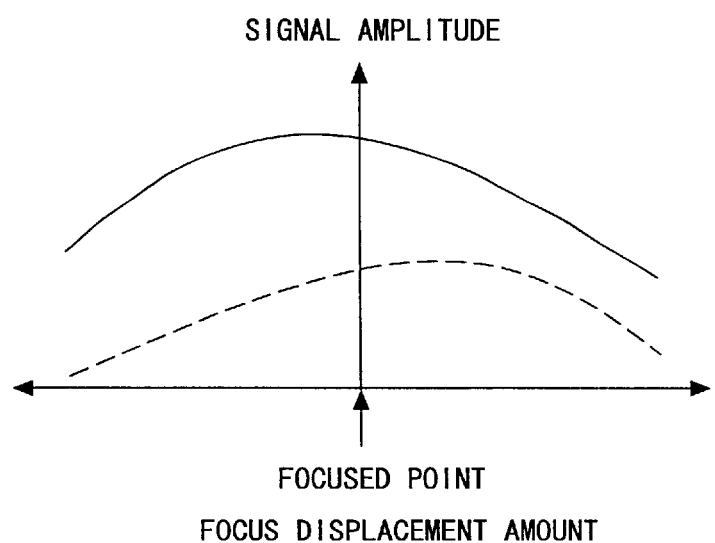
FIG. 5 is a similar view but illustrating a variation of the amplitude with respect to the displacement amount of the focus of the playback signal of the particular pattern shown in FIG. 3 where a spherical aberration is involved.
Figure 17:
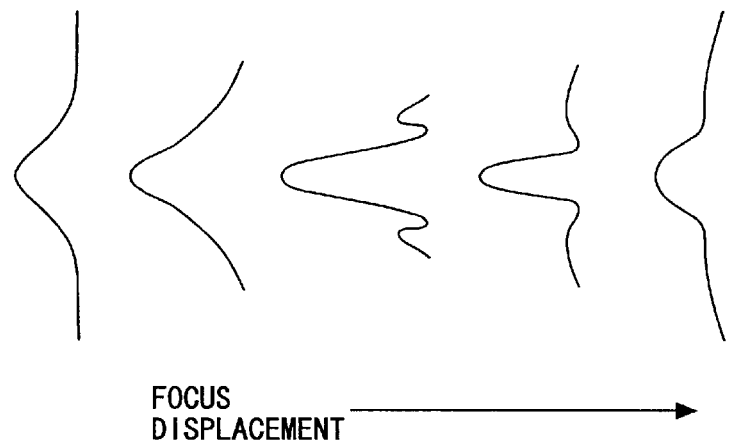
FIG. 17 is a similar view but showing a variation of the spot intensity distribution with respect to a variation of the focus displacement where the displacement of the thickness of a transparent substrate exceeds the tolerance.
Figure 18:
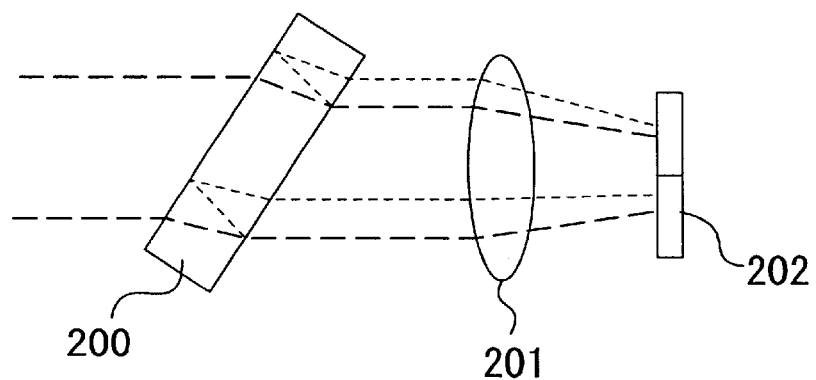
FIG. 18 is a schematic view showing a general configuration of a conventional aberration detection apparatus.

FIG. 5 is a view illustrating a variation of the amplitude of the playback signal with respect to the amount of the displacement of the focus of a playback signal of the particular pattern when a spherical aberration is involved. In FIG. 5, a solid line curve indicates an amplitude variation of the playback signal of the pit train 5 of the longer period, and a broken line curve indicates an amplitude variation of the playback signal of the pit train 6 of the shorter period. Also in the present example, while the focus of the playback optical system is displaced, the amplitude variation of the playback signal from the pit trains 5 and 6 is detected in a similar manner as in the case of FIG. 4 described above. As can be seen from the present example, if the thickness of the transparent thickness is displaced to cause an aberration to appear, then the variation of the amplitude of the playback signal with respect to the focus displacement amount becomes different between the pit train 5 of the longer period and the pit train 6 of the shorter period. Particularly, a remarkable difference appears between the focus displacement amounts (focus offset amounts) which provide a maximum amplitude. In the example of FIG. 5, in the playback signal of the pit train 5 of the longer period, a maximum amplitude is provided forwardly of the focus point (forwardly of the focus of the playback optical system), and in the playback signal of the pit train 6, a maximum amplitude is provided on the rear side of the focus point (rear side to the focus of the playback optical system). This arises from the two points that the variation of the beam shape is asymmetrical before and after the focused point as seen in FIG. 17 and that the beam shape condition with which the apparent amplitude exhibits a maximum value is different depending upon the pit period.

The focus displacement amounts (focus offset amounts) described above with reference to FIG. 5 with which maximum amplitudes of the pit train 5 of the longer period and the pit train 6 of the shorter period are provided correspond to a spherical aberration which is caused by the displacement of the substrate thickness of the transparent substrate and is to be corrected. Consequently, by correcting the spherical aberration of the optical system itself so that the amplitude variations of the playback signals from the pit train 5 of the longer period and the pit train 6 of the shorter period shown in FIG. 5 may approach the amplitude variations shown in FIG. 4 or by performing correction in a frequency band of a signal output of the photo-detector for detecting reflected light from the pit train, the influence of the spherical aberration caused by the displacement of the substrate thickness of the transparent substrate upon the very small spot can be eliminated.

As described above, in the optical disk 1 of the present embodiment, a particular pattern for spherical aberration detection is provided on the disk side, and a displacement of the substrate thickness can be detected with an optical system of a conventional optical head without providing a new optical system for detecting a spherical aberration. Further, since such a particular pattern has a very small data amount, it does not deteriorate the disk capacity.

Further, with the optical disk 1 of the present embodiment, since only it is necessary to provide a particular pattern in the particular region 2 of the recording face of the disk, an existing method can be used for production of the disk, and the cost does not increase.

Furthermore, since such variations of the amplitudes of the playback signals of the pit trains of the long and short periods as seen in FIG. 5 exhibit reversal of the sign of the focus displacement with which a maximum amplitude is provided depending upon whether the substrate thickness is displaced to the thicker side or the thinner side, there is an advantage that not only an absolute value of the aberration but also discrimination based on the sign can be performed.

In the optical disk of the present embodiment described above, only if a spherical aberration caused by a displacement of the substrate thickness can be detected, the particular region 2 may be provided at any position on the disk. However, preferably the particular region 2 is provided such that the spherical aberration can be corrected comparatively effectively. For example, if part of the lead-in region of the innermost circumference at which an optical disk apparatus performs pull-in of servoing or acquisition of disk information is used as the particular region 2 as shown in FIG. 1A, then detection of a spherical aberration caused by a displacement of the substrate thickness can be performed in an initial stage of playback of the disk. Meanwhile, if the displacement of the substrate thickness of the transparent substrate 3 is substantially equal over the entire area of the optical disk 1, then it is sufficient if the particular region 2 is provided at one suitable location of the optical disk 1. Where the substrate thickness of the transparent substrate 3 is not uniform, preferably the particular region 2 is provided taking the variation of the substrate thickness into consideration. Where the transparent substrate 3 is produced, for example, by injection molding, since molten resin is flowed in a radial direction, the thickness of the substrate varies in a radial direction of the disk (radius dependency). In such an instance, preferably the particular region 2 is provided at a plurality of particular regions in a radial direction of the disk.

Figure 6:
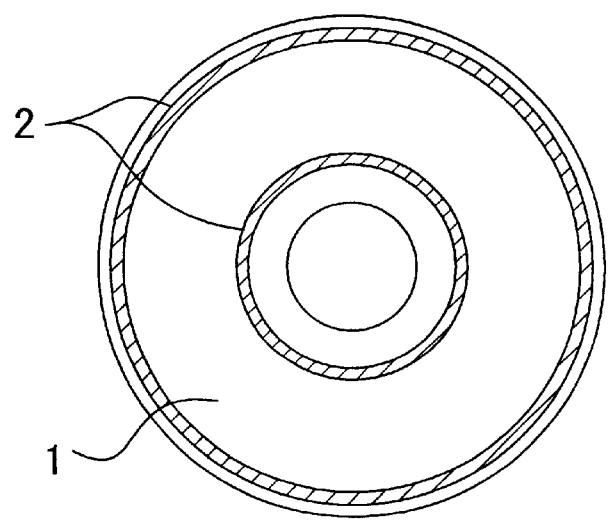
FIGS. 6 and 7 are schematic views showing different examples of an arrangement of the particular region of the optical disk shown in FIGS. 1A and 1B.
Figure 7:
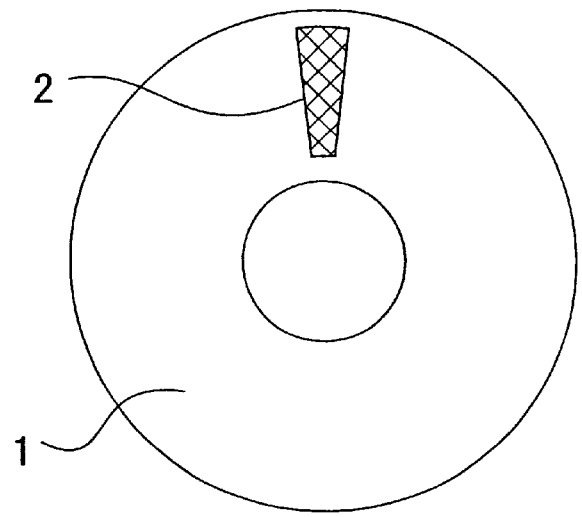

Particular arrangement examples of the particular region are shown in FIGS. 6 and 7. In the example of FIG. 6, the particular region 2 is provided in each of the lead-in region (region indicative of the start of data) of the innermost circumference and the lead-out region (region indicative of the end of data) of the outermost circumference of the optical disk 1. In this instance, if the thickness dependency in a disk radial direction is substantially fixed, then the thickness displacement amount in an intermediate region can be estimated readily from the substrate thickness displacement amounts at the two locations. Meanwhile, in the example of FIG. 7, the particular region is provided at a particular position in a rotational direction such that it extends radially from the inner circumference to the outer circumference. This example is advantageous in that the thickness displacement can be detected at any radial position.

It is to be noted that, where the recording layer of the optical disk 1 is a multilayer medium, the particular region may be provided for each layer such that the aberration displacement amount may be determined for each layer. Further, where the recording layer of the optical disk 1 is a multilayer medium and the accuracy of the layer distance between the information recording layers is obtained sufficiently, the particular region may be provided for a predetermined layer (one layer) while the aberration displacement amount of any other information recording layer may be determined by adding a fixed displacement amount to a correction amount for the predetermined layer.

As regards the periods of the particular pattern to be formed in the particular region, if a minimum period and a maximum period of a coded pit train used commonly for data to be recorded are selected, then detection with a high sensitivity can be achieved. For example, in a CD system, while pits whose lengths are different little by little from one another are formed along circumferences of the disk, totaling nine different lengths are used for the pits. In this instance, the lengths of the minimum pit and the maximum pit are the length equal to three times a basic unit and the length equal to 11 times the basic unit, respectively. Where the periods of the minimum pit and the maximum pit are used as the periods of the particular pattern to be formed in the particular region, also the periods of pits of the remaining 7 patterns are covered and an influence of a spherical aberration can be eliminated efficiently. Further, if three or more periods are utilized as the periods of the particular pattern, then an influence by a spherical aberration can be corrected finely for each of the periods, and detection with a reduced dispersion over the entire signal can be anticipated.

In the example of the particular pattern shown in FIG. 2, the same pattern is formed also in an adjacent track. Such a manner of formation of the particular pattern as just described is effective where the aberration amount variation range is great and an increase of the beam diameter upon detection of an aberration amount increases the crosstalk from the adjacent track. Further, if the same particular pattern is formed on a great number of tracks which cover the amount of eccentricity of the optical disk, then an aberration amount can be detected using only focusing servoing without using tracking servoing. It is to be noted that, where the aberration amount variation is not very great, the recorded pattern may be different from that of an adjacent track.

Further, if a pit train having a plurality of periods is formed in one circumference of a track, then there is an advantage that amplitude data of the different periods can be acquired in one rotation without movement to another track. Furthermore, if a plurality of pit trains of the same period are disposed at different locations of the same circumference and amplitude data from the positions are averaged, then dispersion components involved in rotation can be averaged and aberration detection with a high degree of accuracy can be anticipated.

Figure 8:
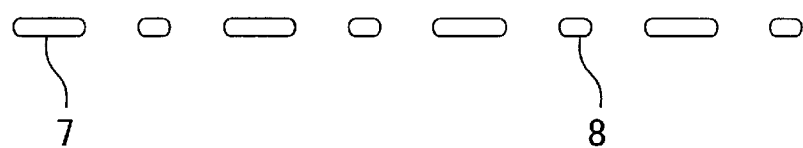
FIG. 8 is a schematic view showing another example of the particular pattern of the optical disk shown in FIGS. 1A and 1B.

Also a pattern wherein pits 7 and 8 (pit 7>pit 8) having different lengths are disposed alternately in a fixed period as shown in FIG. 8 can be utilized as the particular pattern. In this instance, an occurrence amount of aberrations can be detected from the fact that the ratio of signal amplitudes at the individual pits when the pit train is played back is displaced from an estimated amplitude ratio. Although the range of aberrations which can be detected is smaller than that where a plurality of patterns of different periods are utilized as described above, there is an advantage that the detection is possible with the smaller pattern length.

It is to be noted that, while the foregoing description is given such that pits of different lengths are used, those whose lengths differ may be not pits but spaces. In this instance, only the signal polarity is reversed.

Also a different method is available wherein, as the particular pattern, a combination of a pit train of a VFO (Variable Frequency Oscillator) pattern formed in a fixed short period by a VFO circuit which generates a peak pulse corresponding to a peak position of an output voltage which increases in proportion to a differential value of a magnetic field generated from a medium upon reading out and another following pit train of a random pattern including a long mark pattern is used. Where the aberration amount is not very great, since the envelope amplitude (envelopes interconnecting amplitude values of a waveform along the axis of time) of the random pattern can be regarded as equivalent to a playback amplitude of the long period pattern, where it is combined with the playback amplitude of the VFO pattern of the short period, detection of an aberration caused by the substrate thickness displacement can be performed in accordance with the same principle as that where the long and short periods are used as described above. In this instance, there is an advantage that the particular pattern can be used commonly with preformat data. It is to be noted, however, that it is difficult to use such an address header region as is used in a conventional recording medium as it is as the particular pattern because the length of an address region which is regarded as the random region is excessively short when compared with the length of the VFO pattern and also the frequency of the long mark patterns is not fixed.

Now, an optical disk apparatus which can perform aberration correction upon recording or playback of information using the optical disk described above is described.

Figure 9:
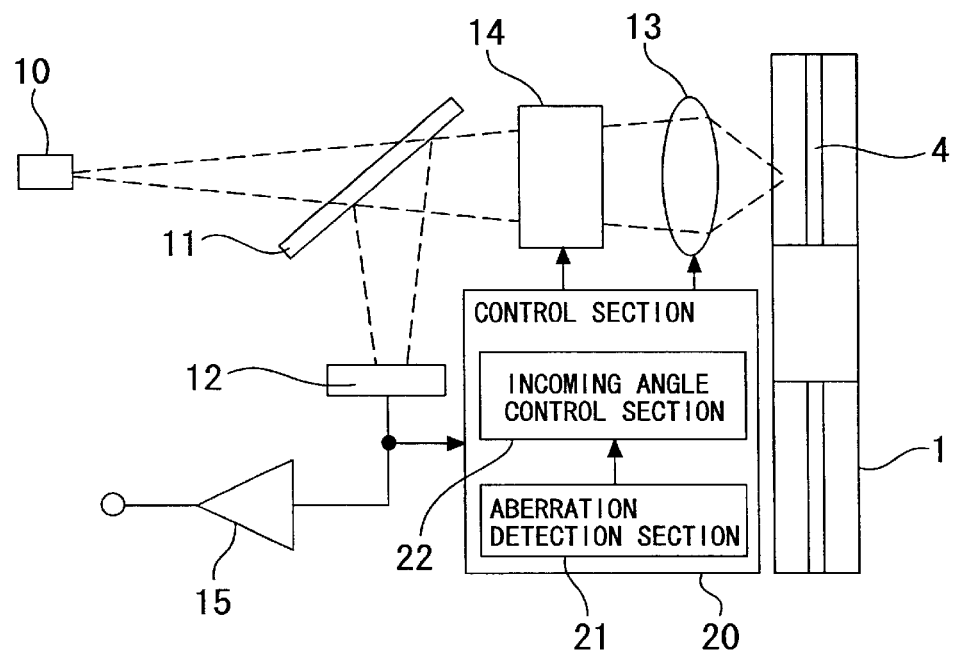
FIG. 9 is a block diagram showing an optical head of an optical disk apparatus to which the present invention is applied and which can perform aberration correction using the optical disk shown in FIGS. 1A and 1B.

FIG. 9 is a block diagram showing an optical head of an optical disk apparatus to which the present invention is applied and which can perform aberration correction using the optical disk of the present invention. Referring to FIG. 9, the optical disk apparatus shown includes a laser light source 10, and a beam splitter 11, an aberration correction element 14 and a condenser 13 disposed successively in an advancing direction of laser light emitted from the laser light source 10. The laser light is condensed by the condenser 13 so that a very small spot is formed on the recording face of an information recording layer 4 of an optical disk 1 used as a recording medium. Further, reflected light from the optical disk 1 successively passes through the aberration correction element 14 and the aberration correction element 14 again and enters the beam splitter 11. A photo-detector 12 is disposed in an advancing direction of that portion of the incoming light which is reflected by the beam splitter 11. A variable frequency characteristic amplifier 15 is provided at an output of the photo-detector 12. In an actual optical system, an optical system for detecting a focusing error and a tracking error is incorporated. However, since it does not relate to the principle of the present invention, it is omitted here. It is to be noted that a conventional optical system can be utilized as it is for the error detection system. Further, the condensing optical system may use a collimate lens or use a configuration for splitting reflected light efficiently by means of a polarizing beam splitter and a quarter-wave plate.

Figure 10:
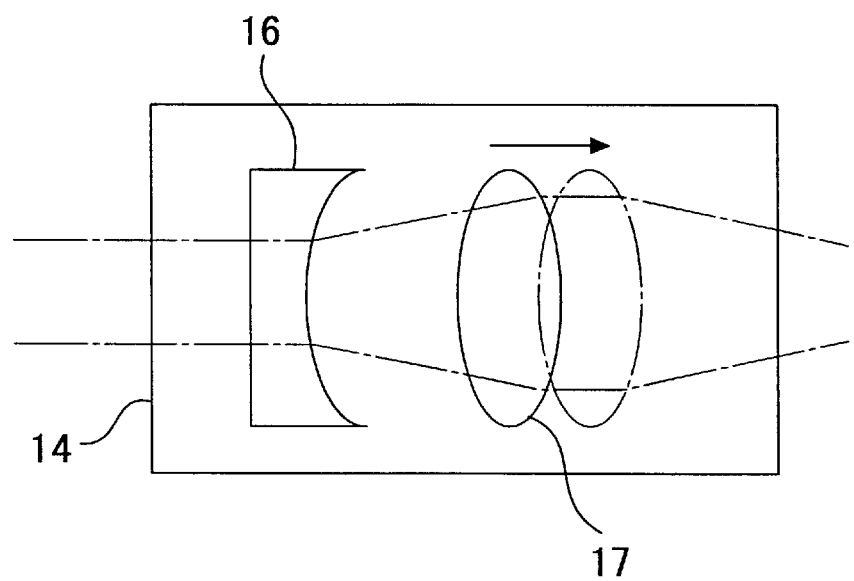
FIG. 10 is a schematic view showing an example of an aberration correction element shown in FIG. 9.

The aberration correction element 14 varies the diverging or converging angle of an incoming light beam to the condenser. FIG. 10 shows an example of the aberration correction element. Referring to FIG. 10, the aberration correction element shown includes a combination of a concave lens 16 and a convex lens 17. The diverging or converging angle of the incoming light beam to the condenser can be varied by varying the distance between the concave lens 16 and the convex lens 17. Consequently, the incoming angle of the beam to the condenser can be controlled, and correction of an aberration caused by substrate thickness displacement utilizing a spherical aberration caused by the condenser itself can be performed.

Figure 11:
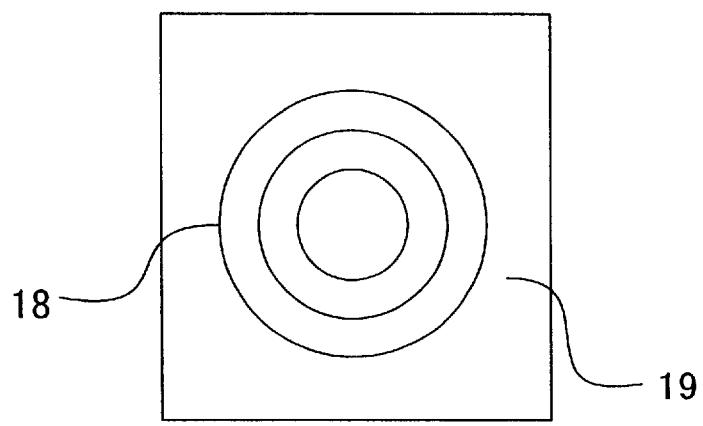
FIG. 11 is a schematic view showing a general configuration of a variable focus lens which uses liquid crystal as the aberration correction element shown in FIG. 9.
Figure 12:
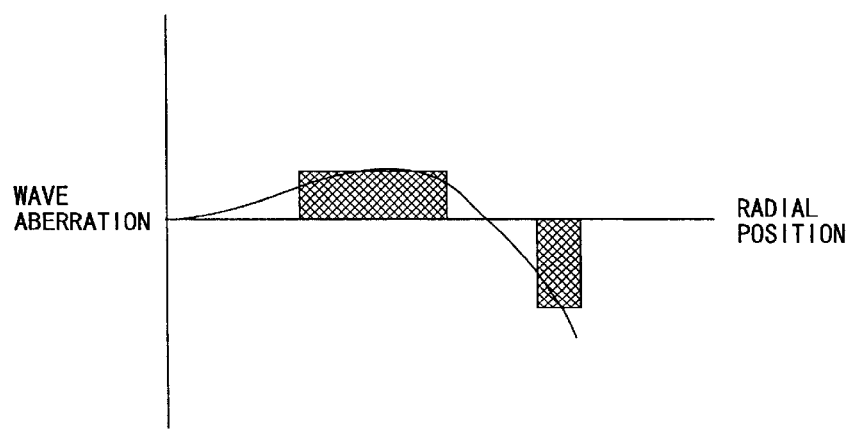
FIG. 12 is a characteristic diagram illustrating a relationship between the wave aberration and the disk radial position.

FIG. 11 is a schematic view showing a general configuration of a variable focus lens employing liquid crystal which is another form of the aberration correction element. Referring to FIG. 11, the variable focus lens shown is formed from a liquid crystal element 19 having a concentrical electrode pattern 18. In the variable focus lens, the phase variation amount of liquid crystal transmission light can be controlled with a voltage applied to the electrode pattern 18. A wave aberration caused by displacement of the substrate thickness exhibits, as indicated by a solid line in FIG. 12, reversal between the positive and negative signs of the wave aberration across a certain position (in the proximity of a focused point) in a disk radial direction such that the sign of the wave aberration is positive on the inner circumference side and negative on the outer circumference side. Particularly on the outer circumference side, the wave aberration exhibits a tendency that it increases progressively toward the outer circumference side. By performing such control of the phase variation amount of liquid crystal transmission light by liquid crystal as indicated by a slanting line region in FIG. 12 against such radial position dependency as just described, a condensed spot almost equivalent to that where there is no substantial aberration can be obtained.

For the aberration correction element, a combination of two convex lenses, a hologram lens or the like can be used in addition to those described above. Where a collimator lens is used for the condensing optical system, a similar effect can be anticipated by moving the position of the collimator lens itself in the direction of an optical axis thereof.

Referring back to FIG. 9, a control section 20 controls the adjustment of the diverging or converging angle of an incoming light beam by the aberration correction element 14 so that the amplitude of the playback signal of the particular pattern formed in a particular region of the recording face of the information recording layer 4 of the optical disk 1, which is outputted from the photo-detector 12, may be a predetermined amplitude. The control section 20 has an aberration detection section 21 and an incoming angle control section 22 whose operation is different whether the particular pattern is such as shown in FIG. 2 or such as shown in FIG. 8.

Where the particular pattern is such as shown in FIG. 2, while the aberration detection section 21 first moves the aberration correction element 14 along its optical axis, it obtains, from an output of the photo-detector 12, a playback signal of the particular pattern formed in a particular region of the recording face of the aberration correction element 14 and including a plurality of pit trains having different periods from each other and disposed alternately. Then, the aberration detection section 21 determines amplitude variations with respect to focus displacement amounts of playback signals of the individual pit trains from the obtained playback signal and determines focus offset amounts each of which exhibits a maximum amplitude from the determined amplitude variations of the playback signals of the pit trains. Then, the incoming angle control section 22 controls the adjustment of the diverging or converging angle of the incoming light beam by the aberration correction element 14 so that the difference between the focus offset amounts of the different pit trains determined by the aberration detection section 21 may be minimized.

Where the particular pattern is such as shown in FIG. 8, the aberration detection section 21 first determines, from a playback signal, outputted from the photo-detector 12, of the particular pattern formed in a particular region of the recording face of the information recording layer 4 and including pits 7 (or spaces between pits) of a first length and pits 8 (or spaces between pits) of a second length disposed alternately in a fixed period, the ratio between the amplitude of the playback signal from a pit 7 (or a space between pits) and the amplitude of the playback signal from a pit 8 (or a space between pits). Then, the incoming angle control section 22 controls the adjustment of the diverging or converging angle of the incoming light beam by the aberration correction element 14 so that the amplitude ratio determined by the aberration detection section 21 may have a predetermined value.

Figure 13:
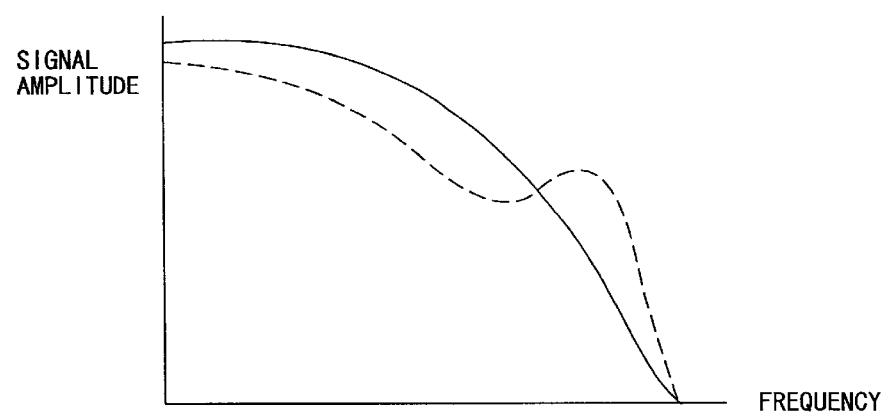
FIG. 13 is a characteristic diagram illustrating the principle of correction by a variable frequency characteristic amplifier shown in FIG. 9.

FIG. 13 is a view illustrating the principle of correction by a variable frequency characteristic amplifier. Within a range wherein the appearing spherical aberration is not very large, the signal amplitude played back from an optical disk exhibits such a variation that the high frequency side is emphasized as seen from a dotted line curve from a solid line curve of FIG. 13. Accordingly, if the characteristic of the variable frequency characteristic amplifier is selected so that the variation of the frequency characteristic may approach its original frequency characteristic (indicated by the solid line curve in FIG. 13), then the playback signal characteristic can be corrected. Although the aberration correction by the variable frequency characteristic amplifier cannot cope readily with a case wherein the substrate thickness displacement is great, it has an advantage that a conventional optical head optical system can be utilized as it is.

Figure 14:
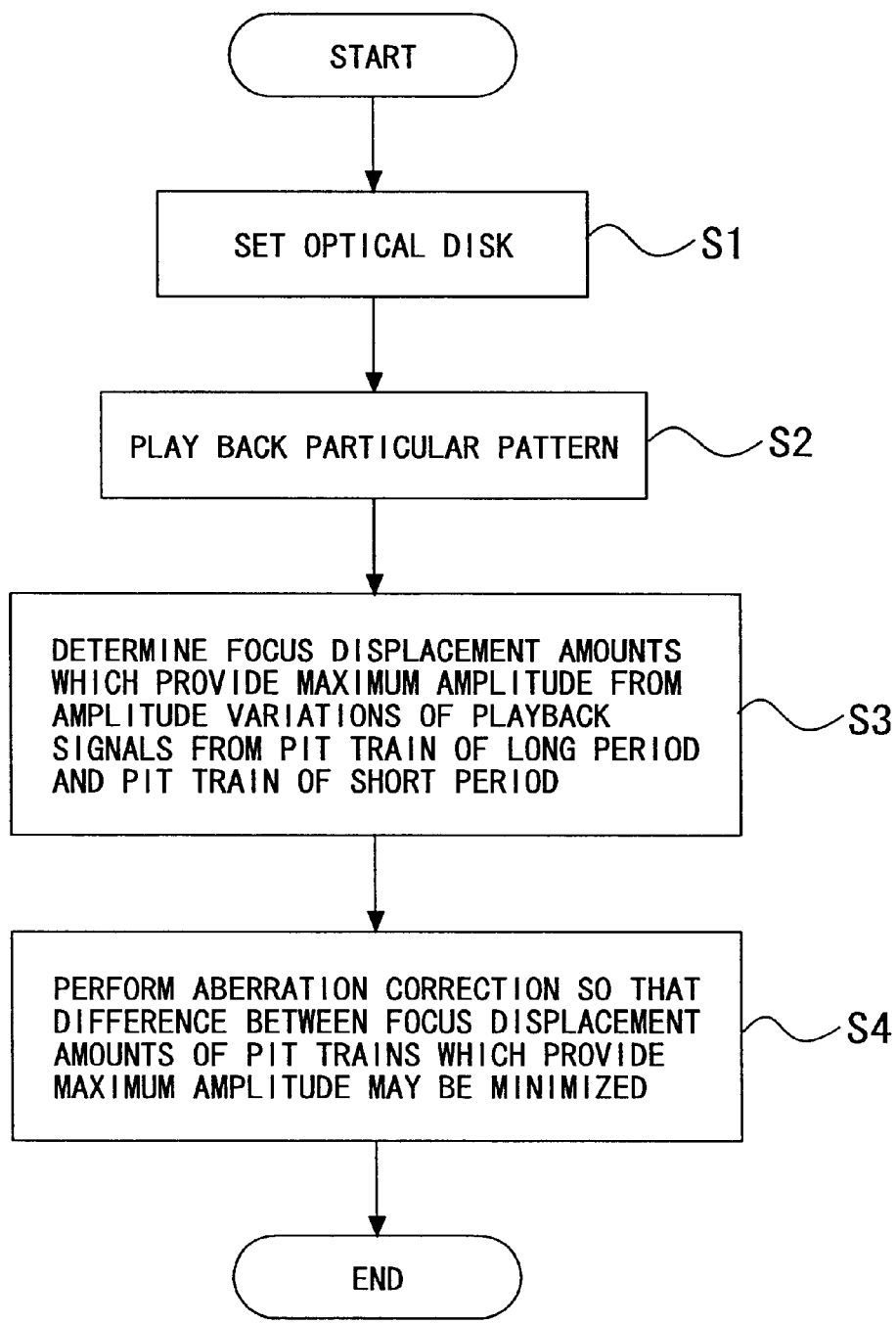
FIG. 14 is a flow chart diagram illustrating a correction procedure of a spherical aberration using the optical head of the optical disk apparatus shown in FIG. 9.
Figure 15:
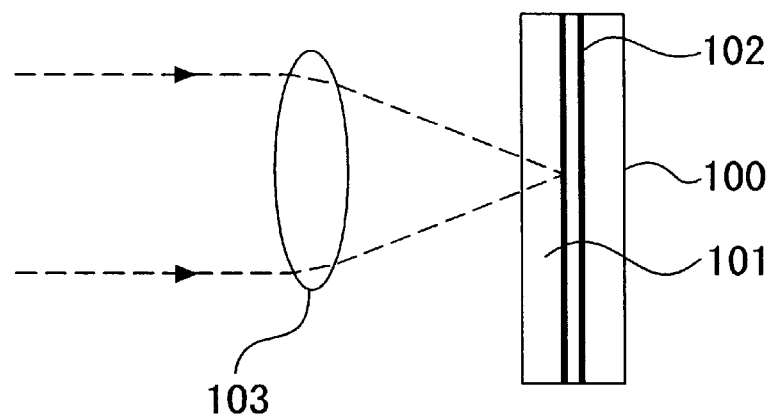
FIG. 15 is a schematic view illustrating a manner wherein a very small spot is formed on an information recording layer of a conventional optical disk.
Figure 16:
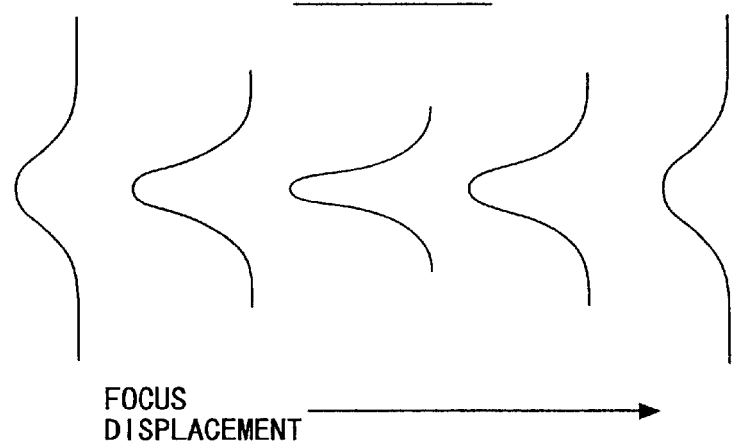
FIG. 16 is a diagrammatic view showing a variation of the spot intensity distribution with respect to a variation of the focus displacement where the displacement of the thickness of a transparent substrate is within a tolerance.

Now, aberration correction operation of the optical disk apparatus is described. FIG. 14 is a flow chart illustrating a correction procedure of a spherical aberration using the optical head of the optical disk apparatus shown in FIG. 9.

After an optical disk 1 is set in position (step S1), servoing is rendered operative in a state wherein no aberration correction is performed to play back the particular pattern (step S2). This particular pattern playback is performed while the condenser 13 is moved back and forth along the optical axis thereof. If a spherical aberration appears due to a thickness displacement of the transparent substrate 3, then the amplitude variation of the playback signal is different between the pit train 5 of a long period and the pit train 6 of a short period as shown in FIG. 5. Then, a focus displacement amount which provides a maximum amplitude is determined from each of the playback signal amplitude variations of the individual pit trains (step S3). Then, aberration correction by the aberration correction element 14 is performed so that the difference between the determined focus displacement amounts of the individual pit trains may be minimized (step S4).

If sufficient aberration correction cannot be performed by the aberration correction processing in steps S2 to S4 in the aberration correction operation described above, then the processing in steps S2 to S4 can be repeated so that an optimum state may be approached.

Further, if also the focus displacement amount (focus offset amount) is optimized simultaneously with the aberration correction, then a condensed spot nearer to an ideal one can be obtained. In this instance, a method wherein the processes of aberration correction and focus displacement correction are repeated alternatively like aberration correction, focus displacement correction, aberration correction and focus displacement correction to proceed with optimization or another method wherein the aberration and focus displacement amounts are varied simultaneously until an optimum condition is reached may be used.

It is to be noted that the aberration correction flow described above is a flow of processing where the particular pattern is such as shown in FIG. 2, and where the particular pattern is such as shown in FIG. 8, the processing in steps S3 and S4 illustrated in FIG. 14 is modified in the following manner.

From the playback signals of a pit 7 (or a space between pits) and a pit 8 (or a space between pits) obtained in step S2, the ratio between the amplitude of the playback signal from the pit 7 (or space between pits) and the amplitude of the playback signal from the pit 8 (or space between pits) is determined, and aberration correction by the aberration correction element 14 is performed so that the amplitude ratio may have a predetermined value.

After the aberration correction with the particular pattern is performed in such a manner as described above, playback of data pits recorded on the information recording layer 4 of the optical disk 1 is performed. Usually, the optical disk apparatus includes a storage section (semiconductor memory or the like) for storing adjustment values of the diverging or converging angle of an incoming light beam by the aberration correction element set through the correction processing described above so that the amplitude of the playback signal of the particular pattern may have a predetermined amplitude, and upon playback of a pit train other than the particular pattern formed on the recording face of the information recording layer 4, the control section 20 calculates an adjustment value for the pit train through interpolation from the adjustment values stored in the storage section in accordance with the period and the disk radial position of the pit train and performs adjustment of the diverging or converging angle of the incoming light beam by the aberration correction element 14 in accordance with the adjustment value calculated through the interpolation.

It is possible to provide the particular region 2 of the optical disk 1 in a plurality of regions in a disk radial direction and, in the aberration correction operation described above, determine aberration correction amounts at the individual positions in advance and then calculate a correction amount at a radial position, at which the particular pattern is not provided, through interpolation in accordance with a predetermined function. With a usual substrate produced by injection molding, even if it is assumed that the substrate thickness exhibits a linear variation in a radial direction, the aberration can be corrected with a considerable degree of accuracy. Further, with such a transparent substrate (transparent film) as is formed by spin coating, since it exhibits a characteristic that it has a thickness progressively increasing only at an outermost circumference portion, the particular region 2 should be provided to effect correction taking the characteristic into consideration.

Where the optical disk 1 is of the recordable type but does not have the particular pattern formed in advance thereon, it is possible to first perform recording operation of the particular pattern in a condition wherein aberration correction is not performed and then play back the recorded pattern to perform aberration correction. Further, since a recordable optical disk in most cases has a region for exclusive use for test recording provided in the lead-in region or the like in order to perform recording power calibration and so forth, it is possible to utilize the region to record the particular pattern.

While the optical disk apparatus described above indicates, as means for correcting a spherical aberration caused by a displacement of the substrate thickness of the transparent substrate of the optical disk 1, the optical aberration correction element 14 and the variable frequency characteristic amplifier 15 which performs correction in the frequency band of the signal output of the photo-detector 12, a configuration which includes only one of them may be adopted.

While a preferred embodiment of the present invention has been described using specific terms, such description is for illustrative purposes only, and it is to be understood that changes and variations may be made without departing from the spirit or scope of the following claims.

What is claimed is:

1. An optical disk, comprising:
   an information recording layer having a recording face on which a very small spot for recording or playing back information is formed; and
   a transparent substrate for covering the recording face of said information recording layer;
   wherein the recording face of said information recording layer has a particular region in which a particular pattern from which a spherical aberration of the very small spot appears in accordance with a displacement of the thickness of the transparent substrate from a prescribed value.

2. An optical disk as claimed in claim 1, wherein the particular region is part of a lead-in region formed in an innermost circumference region of said disk.

3. An optical disk as claimed in claim 1, wherein the particular region is formed at a plurality of locations of different radial positions of said disk.

4. An optical disk as claimed in claim 3, wherein the particular region is formed at each of part of a lead-in region formed in an innermost circumference region of said disk and part of a lead-out region formed in an outermost circumference region of said disk.

5. An optical disk as claimed in claim 1, wherein the particular pattern includes a plurality of pit trains having different periods from each other and disposed alternately.

6. An optical disk as claimed in claim 5, wherein the particular pattern includes a minimum period and a maximum period of coded data to be recorded on the recording face of said information recording layer.

7. An optical disk as claimed in claim 5, wherein a plurality of pit trains having different periods from each other are disposed alternately over an entire circumference in the same track.

8. An optical disk as claimed in claim 1, wherein the particular pattern includes pits or spaces between pits of a first length and pits or spaces between pits of a second length disposed alternately in a fixed period.

9. An aberration correction method, comprising:
   forming, in a particular region of a recording face of an information recording layer of an optical disk where the recording face of the information recording layer on which a very small spot for recording or playing back information is formed is covered with a transparent substrate, a particular pattern with a plurality of pit trains having periods that are different from each other and are disposed alternately;
   moving a condenser for forming the very small spot along an optical axis of said condenser to play back the particular pattern to determine amplitude variations of playback signals of the pit trains with respect to a focus error amount;
   determining focus offset amounts, each of which provides a maximum amplitude from the amplitude variations of the playback signals of the pit trains; and
   adjusting the angle with which a light beam coming into said condenser diverges or converges so that the difference between the focus offset amounts of the pit trains may be minimized to correct the spherical aberration of the very small spot that appears in accordance with a displacement of the thickness value of said transparent substrate from a prescribed value.

10. An aberration correction method as claimed in claim 9, further comprising correcting a frequency characteristic of a signal output of a photo-detector which detects reflected light from the pits formed on the recording face of said information recording layer so as to be a predetermined frequency characteristic to correct the spherical aberration of the very small spot occurring in accordance with the displacement of the thickness of said transparent substrate from the prescribed value.

11. An aberration correction method, comprising:
   forming, in a particular region of a recording face of an information recording layer of an optical disk wherein the recording face of the information recording layer on which a very small spot for recording or playing back information is formed is covered with a transparent substrate, a particular pattern wherein pits or spaces between pits having a first length and pits or spaces between pits having a second length are disposed alternately in a fixed period; and adjusting the angle with which a light beam coming into said condenser diverges or converges so that the ratio between the amplitude of a playback signal from the pits or the spaces between pits of the first length and the amplitude of another playback signal from the pits or the spaces between pits of the second length may have a predetermined value to correct the spherical aberration of the very small spot which appears in accordance with a displacement of the thickness value of said transparent substrate from a prescribed value.

12. An aberration correction method as claimed in claim 11, further comprising correcting a frequency characteristic of a signal output of a photo-detector which detects reflected light from the pits formed on the recording face of said information recording layer so as to be a predetermined frequency characteristic to correct the spherical aberration of the very small spot occurring in accordance with the displacement of the thickness of said transparent substrate from the prescribed value.

13. An optical disk apparatus, comprising:
a condenser movable along an optical axis thereof for forming a very small spot for recording or playing back information on a recording face of an information recording layer of an optical disk wherein the recording face of the information recording layer is covered with a transparent substrate;

an aberration correction element for adjusting the angle with which a light beam incoming to said condenser diverges or converges;

a photo-detector for detecting reflected light from a pit formed on the recording face of the information recording layer; and a controller for controlling the adjustment of the diverging or converging angle of the incoming light beam by said aberration correction element so that the amplitude of a playback signal, outputted from said photo-detector, of a particular pattern formed in a particular region of the recording face of the information recording layer from which a spherical aberration of the very small spot occurring in accordance with a displacement of the thickness of the transparent substrate from a prescribed value can be detected may be a predetermined amplitude.

14. An optical disk apparatus as claimed in claim 13, wherein said controller includes:
an aberration detector for moving said condenser along the optical axis of the same to obtain, from the output of said photo-detector, a playback signal of the particular pattern formed in the particular region of the recording face of the information recording layer and including a plurality of pit trains having periods different from each other and disposed alternately, determining, from the obtained playback signal, amplitude variations of the playback signals of the pit trains with respect to a focus error amount and determining focus offset amounts each of which provides a maximum amplitude from the determined amplitude variations of the playback signals of the pit trains; and an incoming angle controller for controlling the adjustment of the angle with which the incoming light beam diverges or converges by said aberration correction element so that the difference between the focus offset amounts of the pit trains determined in by said aberration detector may be minimized.

15. An optical disk apparatus as claimed in claim 13, wherein said controller includes:
an aberration detector for determining, from the playback signal, outputted from said photo-detector, of the particular pattern formed in the particular region of the recording face of the information recording layer and including pits or spaces between pits of a first length and pits or spaces between pits of a second length disposed alternately in a fixed period, a ratio between the amplitude of the playback signal from the pits or the spaces between pits of the first length and the amplitude of the playback signal from the pits or the spaces between pits of the second length; and an incoming angle controller for controlling the adjustment of the diverging or converging angle of the light beam by said aberration correction element so that the amplitude ratio determined by said aberration detector may have a predetermined value.

16. An optical disk apparatus as claimed in claim 13, further comprising a variable frequency characteristic amplifier for correcting a frequency characteristic of the signal output of said photo-detector so as to be a predetermined frequency characteristic.

17. An optical disk apparatus as claimed in claim 13, further comprising a storage unit for storing adjustment values of the diverging or converging angle of the incoming light beam by said aberration correction element set so that the amplitude of the playback signal of the particular pattern may be a predetermined amplitude, and wherein said controller calculates, upon playback of a pit train other than the particular pattern formed on the recording face of the information recording layer, an adjustment value for the pit train through interpolation from the adjustment values stored in said storage unit in accordance with a period of the pit train and a radial position of the disk and performs the adjustment of the diverging or converging angle of the incoming light beam by said aberration correction element with the adjustment value calculated through the interpolation.

18. An optical disk apparatus, comprising:
a photo-detector for detecting reflected light from a pit selected from at least two different pit trains formed on a recording face of an information recording layer of an optical disk wherein the recording face of the information recording layer is covered with a transparent substrate; and a variable frequency characteristic amplifier for correcting a frequency characteristic of a signal output of said photo-detector so as to be a predetermined frequency characteristic.

* * * * *